US008723924B2

(12) United States Patent
Mirbach et al.

(10) Patent No.: US 8,723,924 B2
(45) Date of Patent: May 13, 2014

(54) RECORDING OF 3D IMAGES OF A SCENE WITH PHASE DE-CONVOLUTION

(75) Inventors: Bruno Mirbach, Konz (DE); Marta Castillo Franco, Bascharage (ES); Thomas Solignac, Luttange (FR); Frédéric Grandidier, Saint-Max (FR)

(73) Assignee: IEE International Electronics & Engineering S.A. (LU)

( * ) Notice: Subject to any disclaimer, the term of this patent is extended or adjusted under 35 U.S.C. 154(b) by 679 days.

(21) Appl. No.: 12/747,377

(22) PCT Filed: Dec. 9, 2008

(86) PCT No.: PCT/EP2008/067063
§ 371 (c)(1),
(2), (4) Date: Sep. 23, 2010

(87) PCT Pub. No.: WO2009/077378
PCT Pub. Date: Jun. 25, 2009

(65) Prior Publication Data
US 2011/0018967 A1     Jan. 27, 2011

(30) Foreign Application Priority Data
Dec. 18, 2007  (EP) .................................... 07024505

(51) Int. Cl.
*H04N 13/02*     (2006.01)
*H04N 13/00*     (2006.01)
(52) U.S. Cl.
CPC ...... *H04N 13/0007* (2013.01); *H04N 2213/003* (2013.01)
USPC ........................................................ 348/46

(58) Field of Classification Search
CPC ........................ H04N 13/007; H04N 2213/003
USPC ............................................................. 348/46
See application file for complete search history.

(56) References Cited

U.S. PATENT DOCUMENTS

| 6,088,086 A   | * | 7/2000  | Muguira et al. ........... 356/5.15 |
| 6,825,455 B1  |   | 11/2004 | Schwarte                           |
| 2009/0128666 A1 | * | 5/2009  | Rappaport et al. ........... 348/241 |

FOREIGN PATENT DOCUMENTS

| EP | 0792555     | 9/1997 |
| EP | 1659418     | 5/2006 |
| WO | 2007/028774 | 3/2007 |

OTHER PUBLICATIONS

D. Biggs: "Clearing up Deconvolution" Biophotonics International, Feb. 28, 2004, pp. 1-5, XP002484586.
Luan X et al: "3D Intelligent Sensing Based on the PMD Technology" Proceedings of the SPIE, SPIE, Bellingham, VA, vol. 4540, Sep. 17, 2001; pp. 482-487, XP009013588; ISSN: 0277-786X.

(Continued)

*Primary Examiner* — Richard Torrente
(74) *Attorney, Agent, or Firm* — Cantor Colburn LLP

(57) ABSTRACT

A method of recording 3D images of a scene based on the time-of-flight principle is described. The method includes illuminating a scene by emitting light carrying an intensity modulation, imaging the scene onto a pixel array using an optical system, detecting, in each pixel, intensity-modulated light reflected from the scene onto the pixel and determining, for each pixel, a distance value based on the phase of light detected in the pixel. The determination of the distance values includes a phase-sensitive de-convolution of the scene imaged onto the pixel array such that phase errors induced by light spreading in the optical system are compensated for.

14 Claims, 4 Drawing Sheets

(56) References Cited

OTHER PUBLICATIONS

International Search Report; PCT/EP2008/067063; Apr. 3, 2009.

T. Spring, et al., "The Lock-In CCD-Two Dimensional Synchronous Detection of Light"; IEEE Journal of Quantum Electronics vol. 31, No. 9 (1995), pp. 1705-1708.

\* cited by examiner

RECORDING OF 3D IMAGES OF A SCENE WITH PHASE DE-CONVOLUTION

TECHNICAL FIELD

The present invention generally relates to a method of recording 3D images of a scene based upon the time-of-flight measurement principle and to a 3D imager configured for implementing the method.

BACKGROUND

The time-of-flight measurement principle is well known in the field of 3D imaging. 3D cameras (or range cameras) are known that acquire range images in real time based on the time-of-flight (TOF) principle. Such camera generally comprises a light source emitting sinusoidally modulated light into the scene to be imaged in 3D and a pixel array on which the scene is imaged by an optical system. The camera then correlates the light detected in the pixels with the light emitted and determines, for each pixel, the phase difference between emitted and received light. This phase difference is proportional to the radial distance between the camera and the part of the scene that is imaged onto the pixel concerned. As the demodulation is synchronously performed for all pixels of the pixel array, the camera provides an array of distance values associated each to a particular pixel and thus to a particular part of the scene. In the following, we will also use "phase" instead of "phase difference"; it is understood that the phase of the emitted light or a clock signal, used for modulating the emitted light or derived from the modulation of the emitted light, then serves as a reference phase. It should also be noted that, as used herein, "phase" and "phase difference" always refer to the phase of the modulation, not to the phase of the carrier wave that is modulated.

The demodulation process, which leads to the determination of the phase of the light impinging on the pixels, can be carried out in different ways. EP 0 792 555 discloses a 3D camera with a one- or two-dimensional pixel array, each pixel thereof comprising a light-sensitive part, in which charge carriers are generated in response to light impinging thereon, and a light-insensitive part with a plurality of electrical switches and storage cells associated with a respective one of these switches. The charges that are integrated in the light-sensitive part are transferred to the storage cells by sequential actuation of the electrical switches. The electrical switches are controlled in such a way that the charges transferred to a particular storage cell belong to a time interval or time intervals at a known phase of the emitted light. The charges accumulated in the different storage cells are then used to determine the phase of the light having impinged on the pixel, its amplitude and a background light level. More details on that principle of measurement can be found in the paper "The Lock-In CCD—Two-dimensional Synchronous Detection of Light" by Spirig et al. in IEEE Journal of Quantum Electronics 31 (1995), 1705-1708. An improvement of this method of demodulation is described in EP 1 659 418.

U.S. Pat. No. 6,825,455 discloses another way for demodulating the detected light. In this document, the light-sensitive part of each pixel comprises at least two modulation photogates and the light-insensitive region comprises accumulation gates, each of which is associated to a respective modulation photogate. During a first exposition interval, charge carriers generated in the light-sensitive part of the pixel in response to light impinging thereon are exposed to a first voltage gradient modulated at the frequency of the modulation of the emitted light and thereby caused to drift into a first accumulation gate when the voltage is of a first polarity and into a second accumulation gate when the voltage is of the opposite polarity. The charges $q_a$ and $q_b$ so accumulated in the first and second modulation gates, respectively, are determined. During a second exposition interval, charge carriers generated in the light-sensitive part of the pixel are exposed to a second voltage gradient modulated at the same frequency but shifted by a known phase with respect to the first voltage gradient. The charge carrier are again caused to drift into two different accumulation gates in accordance with the polarity of the voltage applied, giving rise to accumulated charges $q_c$ and $q_d$. The phase of the light impinging on the pixel is determined using the values of the accumulated charges. If the phase difference between the voltage gradients amounts to 90°, the phase of the light can be determined as $\phi=\arctan [(q_c-q_d)/(q_a-q_b)]$. Above-cited documents are herewith incorporated herein by reference in their entirety.

For the sake of comprehensibility of the invention, we will briefly recall the basic mathematical concept of the measurement according to the TOF principle in a 3D camera working with continuously modulated light.

An illumination unit of the camera emits a continuously modulated light intensity that can be described by the formula:

$$S(t)=S_0 \cdot (1+\sin(\omega t)) \quad (1)$$

where $S_0$ is the average light intensity and $\omega$ is given by the modulation frequency f, i.e. $\omega=2\pi f$. The scene is thus continuously illuminated with a light power density P that depends on the illumination strength S, the spatial distribution of the light and the distance between scene and camera. A part of the light power, given by a remission coefficient $\rho$, is then remitted by the objects in the scene. As used herein, "remission" designates reflection or scatter of light by a material. The imager optics maps the remitted light that passes through the optical system (e.g. comprising one or more lenses and/or prisms and/or filters, etc.) onto the pixel array of the camera. Assuming an ideal optical system, the received light intensity I(x,t) that arrives at time t on pixel position x=(u,v) of the pixel array thus has the following characteristics:

The light intensity I(x,t) is modulated in time with the same frequency as the emitted light, however, with the phase retarded by a value $\phi$ proportional to the distance r between the camera and the part of the scene that is mapped to point x=(u,v) on the imager. Mathematically, the received light intensity is thus given by the formulas $$I(x,t)=B(x)+A(x)\sin(\omega t-\phi(x)) \quad (2)$$

and $$\phi(x)=2r(x)f/c \quad (3)$$

with c denoting the speed of light, A the amplitude of the modulation of the received light and B (>A) the constant offset of the modulated light and background light originating from other light sources illuminating the scene (e.g. the sun). One assumes here that A, B and $\phi$ are at most slowly varying, so that they may be regarded as constant on the timescale of the modulation.

The amplitude A is thus proportional to the power density P on the part of scene that is mapped onto the corresponding pixel by the optical system, the remission coefficient $\rho$ of that part of the scene and parameters of the optical system that are independent on the light power, like the F-number of the lens.

An ideal optical system maps a point in the scene onto a point in the image plane. In practice, however, light originating from a point in the scene is spread on an area around the theoretical image point. Various physical mechanisms may cause such spread of the image point. Defocusing of the lens causes a locally confined spread area that makes an image to appear unsharp. The relation between sharpness, defocusing and the spread area is described by the concept of depth of field. Other mechanisms leading to a point spread are light diffraction (in case of a small aperture of the lens), multiple light scattering on surfaces of the optical system or light scattering due to a contamination of the surface of the optical system. These physical effects lead to a loss of contrast in the image.

The effect of light spreading of a point source can be described mathematically by the so-called point spread function (PSF). If $x=(u,v)$ and $x'=(u',v')$ define two points in the image plane, the value $g(x',x)$ of the PSF function g indicates the relative amount of light that is mapped onto point x' when the theoretical image point is x. Due to the superposition principle (that is valid for linear systems like an optical imaging system), the effect of the light spreading onto an image can be described by a convolution $$I'=g*I \quad (4a)$$

that is $$I'(x)=\int g(x, x')I(x')dx', \quad (4b)$$

where I denotes the ideal image and I' the actual image affected by light spreading in the optical system. If an image is given as discrete points (pixels) the integral represents a sum over the pixels.

In order to reconstruct the ideal image I from an image I' provided by the optical system, convolution (4a) or (4b) has to be inverted. This inversion is called a de-convolution and is in the ideal case realized by convolution of the image I' with a de-convolution function g' (which fulfils, at least approximately, the condition that it's convolution with g is the Dirac-delta function). Such a de-convolution function is, however, not known in general and also not always uniquely defined. A standard approach toward de-convolution is based on the transformation of the image and the convolution function to Fourier space. However, this approach is not always applicable. In the field of image processing various approaches have been developed for de-convoluting an image at least approximately.

In 2D imaging, light spreading is often negligible under normal conditions (using ambient light and well-focused optics). The point spread function $g(x',x)$ is then close to a delta peak, e.g.:

$$g(x',x)=(1-\epsilon)\delta(x',x)+\epsilon f(x',x) \quad (5)$$

where $f$ is a function normalized to 1 and $\epsilon$ the relative amount of light scattered in the optical system. In a well-focused and clean optical system, $\epsilon$ is typically small e.g. of the order $10^{-3}$. A blur visible for the human eye therefore occurs only if light from a very bright light source (e.g. the sun) is shining into the optical system. In this case, the contribution of the spread light from the bright light source cannot be neglected, since its intensity is many orders of magnitude higher than the light intensity reflected by an object in the scene. If the optical system is contaminated (with dirt or a scratch), the parameter $\epsilon$ is larger, so that light spreading visible for the human eye could result even in normal lighting conditions.

The inventors have recognised that in a TOF camera system broadly illuminating the scene, an effect similar to image blurring due to scattered sun light can occur due to the active illumination. The main reason is that the light power density P on an object in the scene strongly depends on the distance d of the object to the light source ($P\sim1/d^2$). The light intensity I'(x) at the corresponding pixel position x is proportional to the light power density and the remission coefficient $\rho$, i.e.

$$I'(x)\sim\rho/d^2 \quad (6)$$

As an example, an object with a remission coefficient of 50% at a distance of 1 m will generate an intensity value, which is 1000 times larger than the intensity value generated by an object with a remission coefficient of 5% at a distance of 10 m. Therefore, when (5) is substituted into the convolution integral (4b), the contributions of intensities at points $x\neq x'$ are no longer negligible, even if the light scattering factor $\epsilon$ is of the order $10^{-3}$.

It is important to recognise that the phase measurement and thus the computed distance information is falsified by light spreading. This will now be explained in more detail first for a superposition of two modulated light intensities and then for the general case.

The superposition of two modulated light intensities expressible by equation (2) yields:

$$I'(t)=I_1(t)+I_2(t)=(B_1+B_2)+A_1\sin(\omega t-\phi_1)+A_2\sin(\omega t-\phi_2) \quad (7a)$$

I'(t) can again be expressed in the form of one modulated light intensity, i.e.

$$I'(t)=B'+A'\sin(\omega t-\phi') \quad (7b)$$

where $$B'=B_1+B_2$$

$$A'=\sqrt{AS'^2+AC'^2}$$

$$\phi'=\arctan(AS'/AC') \quad (8)$$

with $$AS'=A_1\sin\phi_1+A_2\sin\phi_2=:AS_1+AS_2$$

$$AC'=A_1\cos\phi_1+A_2\cos\phi_2=:AC_1+AC_2. \quad (9)$$

Formulas (7a) to (9) show that the superposition of two modulated intensities with same frequency but different phases and amplitudes results in a modulated intensity with again the same frequency but whose phase depends not only on the phases but also on the amplitudes of the individual intensities being superposed. In other words, light spreading in presence of a non-ideal optical system induces errors in the measured phase values.

Before turning to the general case of superposition of modulated intensities due to spreading, it shall be observed that is convenient to rewrite equation (9) in complex notation:

$$\hat{A}':=A'e^{i\phi'}=A_1e^{i\phi_1}+A_2e^{i\phi_2}=:\hat{A}_1+\hat{A}_2 \quad (10)$$

where AC and AS are the real and the imaginary components, respectively, of the complex amplitude $\hat{A}$, i.e.

$$AS'=\text{Im}\hat{A}'$$

$$AC'=\text{Re}\hat{A}' \quad (11)$$

The superposition principle (9) or (10) for the amplitudes can be straightforwardly generalized for the case that the optical system spreads the light intensity with a point spread function g. Using $$I(t)=B+A\sin(\omega t-\phi)=B-\text{Im}(A\cdot e^{i(\phi-\omega t)})=B-\text{Im}(\hat{A}e^{-i\omega t}) \quad (12)$$

and $$I'(t)=B'+A'\sin(\omega t-\phi')=B'-\text{Im}(A'\cdot e^{i(\phi'-\omega t)})=B'-\text{Im}(\hat{A}'e^{-i\omega t}) \quad (13)$$

and substituting this into equation (4b), the result is $$\hat{A}'(x) = \int g(x, x') \hat{A}(x') dx'. \tag{14}$$

The resulting phase $\phi'(x)$ and amplitude $A'(x)$ are again given by equation (8) using the real and imaginary parts of $\hat{A}'(x)$ as defined in (11).

As a result of the non-negligible superposition, the contrast in phase measurement is reduced. This means that the phases measured in the different pixels are shifted towards the phase of the pixel with the strongest amplitude of modulation. This effect of phase shift is the stronger, the smaller the amplitude of the corresponding pixel is. Therefore, the phase shift caused by light spreading affects mostly background pixel. The objects in the background of the scene appear thus nearer to the camera than they actually are, especially if the background part of the scene has a low remission coefficient.

The invention generally seeks to reduce the effect of light spreading onto the range measurement.

BRIEF SUMMARY

The method of recording 3D images of a scene comprises the following steps:
- illuminating a scene by emitting light carrying an intensity modulation;
- imaging the scene onto a pixel array using an optical system;
- detecting, in each pixel, intensity-modulated light reflected from the scene onto the pixel;
- and determining, for each pixel, a distance value based on the phase of light detected in the pixel.

According to the invention, the determination of the distance values comprises a phase-sensitive de-convolution of the scene imaged onto the pixel array such that phase errors induced by light spreading in the optical system are compensated for. As indicated above, de-convoluting is a known measure for at least partially compensating the effect of light speading in a 2D imager, i.e. an imager not providing depth (or distance or range) information. However, to the knowledge of the inventors, the problem of loss of phase contrast in a 3D imager due to light spreading has not yet been addressed in the literature. The method proposed herein permits the detection of more accurate 3D images. Furthermore, the method enables accurate distance determination in more difficult lighting conditions.

A first embodiment of the method is especially suitable for a 3D imager, which outputs, for each pixel an amplitude value and a phase value (optionally also the constant background intensity but this is irrelevant for the further considerations) of the light impinging on the pixel, including stray light if any. Thus, according to the first embodiment of the invention, for each pixel, an amplitude value ($A'(x)$ using the above notation) and a phase value ($\phi'(x)$) of the intensity-modulated light detected in the pixel are determined. The phase-sensitive de-convolution of the scene imaged onto the pixel array comprises:
- forming a first data array, each array element of the first data array being associated with a respective pixel of the pixel array and having a value corresponding to the amplitude value determined for the associated pixel, possibly weighted with a first phase factor;
- forming a second data array, each array element of the second data array being associated with a respective pixel of the pixel array and having a value corresponding to the amplitude value determined for the associated pixel weighted with a second phase factor, the second phase factor depending on the phase value determined for the associated pixel;
- de-convoluting the first and second arrays using a de-convolution function of the optical system.

For each pixel, the distance value then is calculated based upon the values of the array elements of the de-convoluted first and second arrays associated to the pixel.

Those skilled will appreciate that first phase factor is preferably the cosine of the phase value determined for the associated pixel (i.e. $\cos(\phi'(x))$) and the second phase factor is preferably the sine of the phase value determined for the associated pixel (i.e. $\sin(\phi'(x))$). The elements of the first data array then take the values $$AC'(x) = A'(x) \cdot \cos(\phi'(x)) \tag{15}$$

and those of the second data array take the values $$AS'(x) = A'(x) \cdot \sin(\phi'(x)). \tag{16}$$

Alternatively, the first and second phase factors could be approximations of the cosine and the sine of the phase value, respectively. For instance, using the so-called small-phase approximation. We will first assume that $|\phi'(x)| \ll 2\pi$. In this case, the first phase factor may be set equal to 1 and the determined phase $\phi'(x)$ itself may serve as approximation of the sine of the phase. In this case, the elements of the first data array then take the values $$AC'(x) = A'(x) \tag{17}$$

and those of the second data array take the values $$AS'(x) = A'(x) \cdot \phi'(x). \tag{18}$$

In both cases, the elements of the de-convoluted versions of the first and second data arrays may then be evaluated by:

$$AC(x) = \int g'(x, x') AC'(x') dx' \tag{19a}$$

and $$AS(x) = \int g'(x, x') AC'(x') dx' \tag{19b}$$

where g' is the de-convolution function of the optical system. g' may be given by a matrix if the integral is a sum over all pixels of the pixel array. Equations (19a) and (19b) may be summarised as $$\hat{A}(x) = \int g'(x, x') \hat{A}'(x') dx'. \tag{20}$$

For each pixel, the corresponding distance value can be calculated by evaluating a corrected phase as $$\phi(x) = \arctan(AS(x)/AC(x)), \tag{21}$$

or, if the small-phase approximation is used, as $$\phi(x) = AS(x)/1AC(x). \tag{22}$$

It shall be noted that the small-phase approximation may also be used if the phases of the different pixels $\phi'(x)$ do not necessarily satisfy the condition $|\phi'(x)| \ll 2\pi$ but lie within a relatively narrow range. One may then write $\phi'(x) = \phi_0' + \delta\phi'(x)$ with $|\delta\phi'(x)| \ll 2\pi$, where $\phi_0'$ is an offset common to all the pixels of the array, e.g. the average of the measured phase values $\phi'(x)$ or a predetermined constant. In this case, one may use $\delta\phi'(x)$ instead of $\phi'(x)$ in equations (17) and (18). The de-convolution of the first and second data arrays is achieved through equations (19a) and (19b). One finds the corrected phase $\phi(x)$ using $\delta\phi(x) = AS(x)/AC(x)$ and $\phi(x) = \delta\phi(x) + \phi_0$. Those skilled will note that the subtraction and the latter addition of $\phi_0$ corresponds to a change of the reference phase which may be chosen arbitrarily; therefore, in the following it will be assumed that the reference phase is chosen such that $\phi_0 = 0$ (thus $\phi'(x) = \delta\phi'(x)$) when the small-phase approximation is used.

If it is desired to express the distance in other units than units of phase, this may be done by using equation (3).

According to a second preferred embodiment of the method, the detection of intensity-modulated light reflected from the scene comprises, for each pixel, determining intensity values of the intensity-modulated light impinging on the pixel at different phases of the modulation, the different phases being chosen such that amplitude and phase of the intensity-modulated light impinging on the pixel are derivable from the set of intensity values using a known relationship. However, as those skilled will appreciate, in the second embodiment it is not necessary that the uncorrected amplitude and phase values have actually been calculated using the known relationship. In this case, the phase-sensitive de-convolution of the scene comprises forming data arrays, each array element of the data arrays being associated with a respective pixel of the pixel array and having a value corresponding either to the intensity value of the associated pixel determined at one of the phases of modulation or to a linear combination of at least two intensity values of the associated pixel determined at different phases of the modulation;

de-convoluting the data arrays using a de-convolution function of the optical system;

For each pixel, the distance value is then calculated based upon the values of the array elements of the de-convoluted data arrays associated to the pixel, e.g. by determining the corrected phase from the values of the array elements of the de-convoluted data arrays associated to the pixel.

For each pixel, the actually determined light intensity $I'(x)$ can be mathematically expressed as a function of time according to equation (7b) or (13) with a priori unknown parameters $A'(x)$, $B'(x)$ and $\varphi'(x)$. To allow a determination of these parameters, the intensity values of each pixel thus have to be determined at least three different phases of the modulation, as explained in detail in the paper by Spirig cited above or according to the approach of U.S. Pat. No. 6,825,455 (where the charges $q_a$, $q_b$, $q_b$ and $q_d$ correspond to the intensity values at different phases).

Preferably, the at least three phases of the modulation are regularly spaced; Most preferably, the intensity values are determined at four phases of the modulation, these four phases of the modulation being spaced by 90 degrees. In the latter case, the four data arrays may have as elements the intensity values $I_0'(x)$ associated to the 0°-phase of the modulation, $I_1'(x)$ associated to the 90°-phase of the modulation, $I_2'(x)$ associated to the 180°-phase of the modulation and $I_3'(x)$ associated to the 270°-phase of the modulation, respectively.

These data arrays are then de-convoluted using the de-convolution function of the optical system, yielding the de-convoluted data arrays having as elements:

$$I_k(x) = \int g'(x, x') I_k'(x') dx' \quad (23)$$

where k=0, 1, 2 and 3, respectively. The corrected phase may then be calculated for each pixel based upon the corrected intensity values $I_0(x)$, $I_1(x)$, $I_2(x)$ and $I_3(x)$ using $$AS(x) = A(x) \cdot \sin(\varphi(x)) = \frac{1}{2}(I_2(x) - I_0(x)) \quad (24)$$

$$AC(x) = A(x) \cdot \cos(\varphi(x)) = \frac{1}{2}(I_1(x) - I_3(x))$$

and equation (21).

Instead of de-convoluting data arrays, the array elements of which are each associated with specific phase of the modulation and have a value corresponding to the intensity value of the associated pixel determined at one of the phases of modulation as in equation (23), one may alternatively de-convolute data arrays having as array elements linear combinations of at least two intensity values of the associated pixel determined at different phases of the modulation, e.g. $AS'(x) = (I_2'(x) - I_0'(x))/2$ and $AC'(x) = (I_1'(x) - I_3'(x))/2$. The de-convolution may in this case be effected by computing AS and AC according to equations (19a) and (19b).

According to an advantageous aspect of the invention, a level of contamination of the optical system is evaluated and the phase-sensitive de-convolution is adjusted to the level of contamination. The evaluation of the level of contamination is preferably achieved as explained in European patent application 07 110 379.0.

Another aspect of the invention concerns a 3D imager configured for implementing the method as described before. Such 3D imager (e.g. a 3D camera) may comprise a light source for illuminating a scene by emitting light carrying an intensity modulation, an optical system, an array of pixels configured for detecting intensity-modulated light reflected from the scene and imaged onto the pixel array, and a control and evaluation circuit configured for determining, for each pixel, a distance value based on the phase of light detected in the pixel. The control and evaluation circuit comprises means, e.g. an application-specific integrated circuit (ASIC), a field-programmable gate array (FPGA) and/or a microprocessor, for carrying out a phase-sensitive de-convolution of the scene imaged onto the pixel array in such a way as to compensate for phase errors induced by light spreading in the optical system.

BRIEF DESCRIPTION OF THE DRAWINGS

Further details and advantages of the present invention will be apparent from the following detailed description of several not limiting embodiments with reference to the attached drawings, wherein.

DETAILED DESCRIPTION

Figure 1:
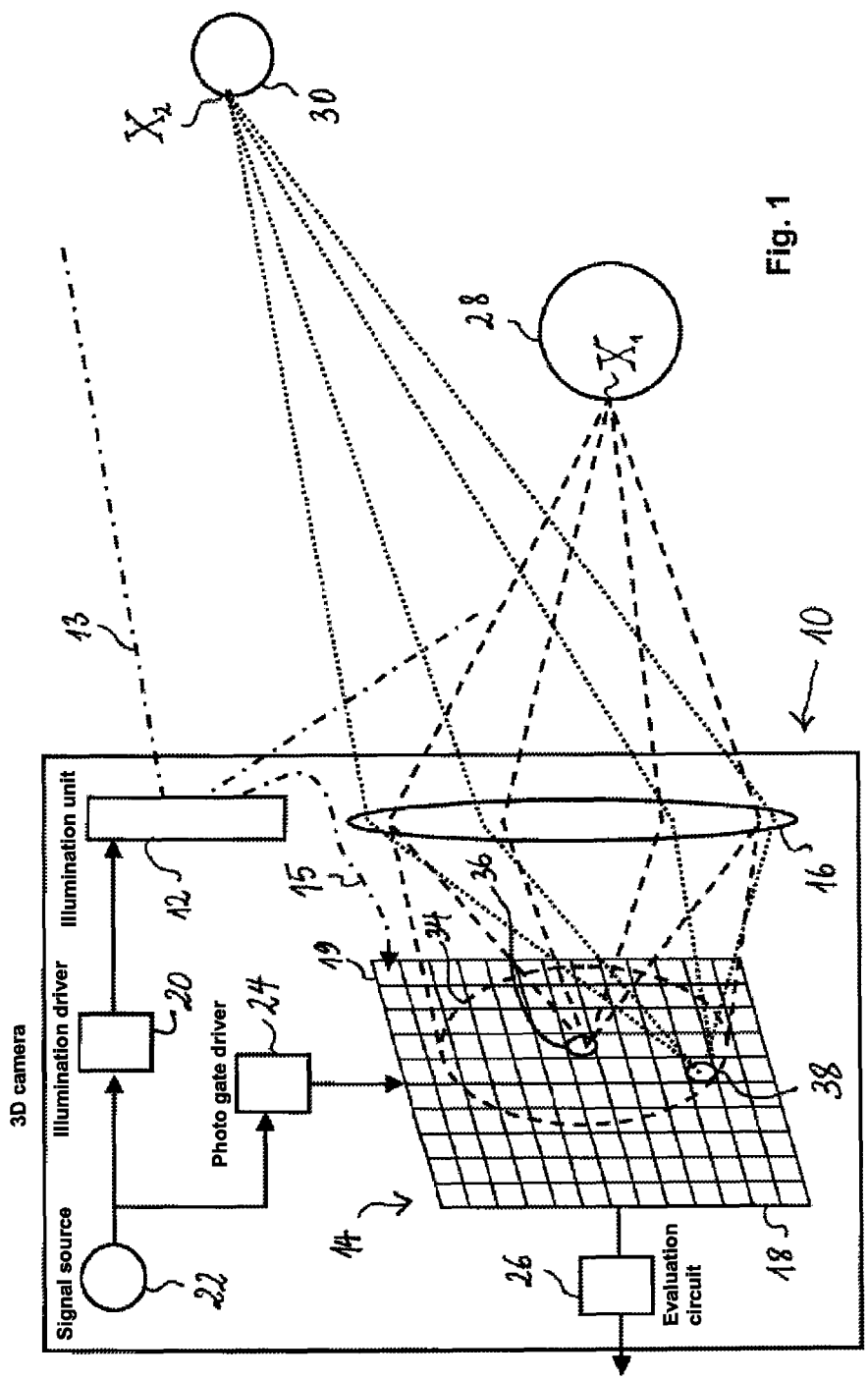
FIG. 1 is a schematic view of a 3D camera operating according to the TOF-principle.

FIG. 1 shows a 3D camera generally identified by reference numeral 10. The 3D camera 10 comprises an illumination unit 12, for emitting sinusoidally modulated light into a scene, a two-dimensional pixel array 14 and an optical system 16 (represented here by a lens) imaging the scene onto the pixel array 14. The pixel array 14 may be implemented as an electronic camera chip of any suitable technology, such as CCD, CMOS and/or TFA. The pixel array comprises individual lock-in pixel sensor cells 18 (herein simply called pixels), on each of which a small portion of the scene is imaged.

The illumination unit 12 may comprise one or several individual light emitting devices, e.g. light emitting diodes (LEDs), which are collectively driven by an illumination driver 20. A clock signal source 22 (e.g. a numerically controlled oscillator) provides the input signals for the illumination driver 20 and the photo gate driver 24, which controls the pixel array 14. An evaluation circuit 26 (e.g. an ASIC, an FPGA, or a digital signal processor (DSP)), connected to the pixel array 14, determines, when the 3D camera is operating, the distance information based upon the charges generated in the pixels.

When the 3D camera 10 is in operation, the signal source 22 generates a modulation signal on its output and feeds this modulation signal to the illumination driver 20. The latter drives the illumination unit 12 with a drive signal, thereby causing the illumination unit to emit light (indicated by the dash-dotted lines 13) carrying a sinusoidal intensity modulation into the scene. For purpose of illustration, the scene is represented here as comprising a foreground object 28 and a background object 30. It should be noted that the drawing is not to scale and the distance between the camera 10 and the objects 28, 30 in the scene is preferably substantially larger than the distance between the illumination unit 12 and the optical system 16 (which are preferably integrated within a single housing). The modulated light is remitted (reflected or scattered) by the objects 28, 30 and a fraction of the remitted light is received by the pixel array 14. The signal source 22 also feeds the modulation signal to the photo gate driver 24 which controls the individual pixels 18 so that they operate, for instance, as described hereinbefore with reference to EP 0 792 555 or U.S. Pat. No. 6,825,455.

Figure 2:
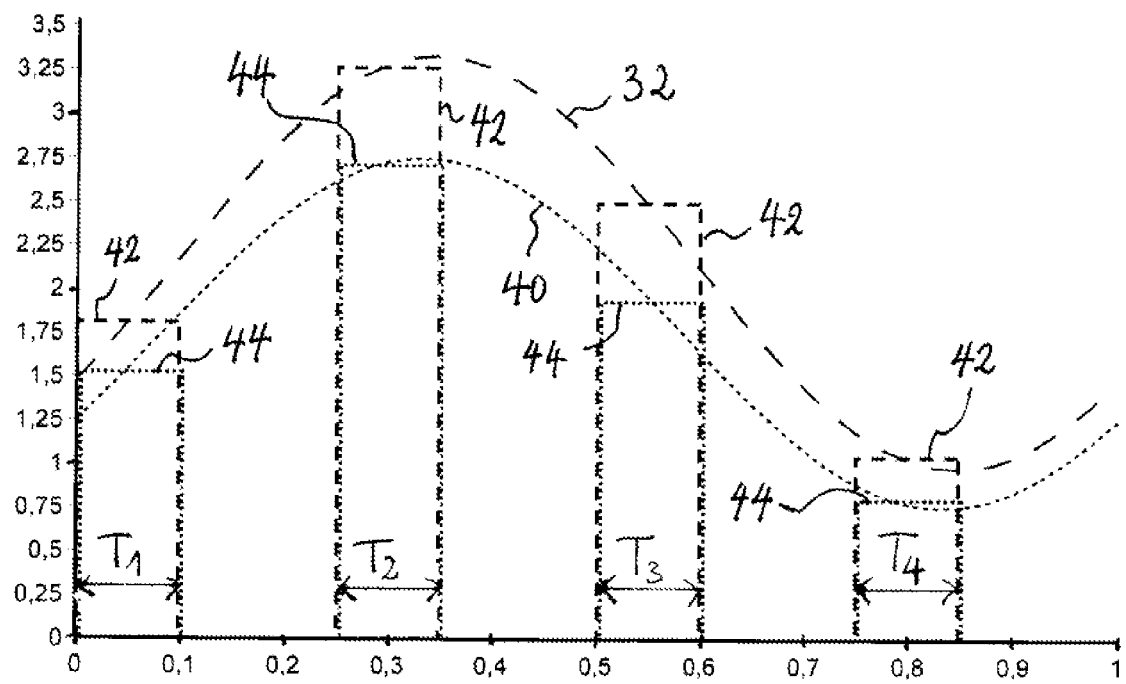
FIG. 2 is an illustration of how the parameters of the intensity waveform are affected in the presence of light spreading.

In the following, we will assume that the pixel array 14 and the photo gate driver 24 are configured so as to operate according to the principles of the former document. In this case, each pixel 18 comprises a light-sensitive part, in which charge carriers are generated in response to light remitted from the scene impinging thereon, and a light-insensitive part with a plurality of electrical switches and storage cells associated with a respective one of these switches. The following considerations of this paragraph are with respect to an individual pixel. The charges that are integrated in the light-sensitive part are transferred to the storage cells by sequential actuation of the electrical switches under the control of the photo gate driver 24. The electrical switches are controlled in such a way that the charges transferred to a particular storage cell belong to a time interval or time intervals at a known phase of the emitted light. FIG. 2 illustrates how these integration intervals may be distributed in one period of the modulation. The light intensity I'(x,t) impinging on the pixel is indicated by the dashed curve 32. Mathematically, it may be expressed by equations (7b) or (13), where the parameters A'(x), B'(x) and φ'(x) are not known from the beginning. The charge carriers generated in the light-sensitive part of the pixel during a first time interval $T_1$ are transferred to a first storage cell by closing the corresponding electrical switch at a specific time. After that transfer, the first electrical switch is opened again and after a specific time interval has elapsed, the charge carriers generated during a second time interval $T_2$ are transferred to the second storage cell by closing the second electrical switch at a specific time. The same process is repeated for the time intervals $T_3$ and $T_4$. It is possible to extend the process over several periods of the modulation. The charges accumulated in the different storage cells thus correspond to intensity values of the modulated light at different phases of the modulation and may be used to determine the parameters A'(x), B'(x) and φ'(x) of the light having impinged on the pixel. With respect to the timescale of the modulation, A'(x), B'(x) and φ'(x) (and thus the corrected parameters A(x), B(x) and φ(x)) are slowly varying. A typical modulation period is, for instance, 50 ns, which corresponds to a 20-MHz modulation or a camera range of 7.5 m. In applications such as occupancy detection of a vehicle seat, the above parameters may be regarded as practically constant over several modulation periods.

One or more of the pixels 18 (e.g. an entire row) of the pixel array are used as reference pixels 19. Light emitted by the illumination unit 12 is guided onto the reference pixels 19 using a light guide 15 (e.g. an optical fibre or a bundle of optical fibres) of known length. The intensity values retrieved from the reference pixel indicate a reference phase having a known offset with respect to the phase of the modulated light at the emission by the illumination unit 12. The reference pixels 19 are appropriately protected from light remitted from the scene to avoid distortion of the reference phase.

As illustrated in FIG. 1, light originating from point $X_1$ in the scene is spread on an area around the theoretical image point. The light spread around the theoretical image point of X1 is indicated by the dashed circle 34. Thus, part of the light that ideally should impinge at the pixel 36 corresponding to the theoretical image point of $X_1$ actually impinges at different pixels 18 of the pixel array 14, such as, for instance the pixel 38 located at the theoretical image point of point $X_2$ in the scene. The intensity values $I_0'$, $I_1'$, $I_2'$ and $I_3'$ (resulting from the charges integrated during the different integration intervals $T_1$, $T_2$, $T_3$ and $T_4$) thus differ from the ideal intensity values (not affected by light spreading). The parameter values of A'(x), B'(x) and φ'(x) of the intensity waveform I'(x) reconstructed from the intensity values $I_0'(x)$, $I_1'(x)$, $I_2'(x)$ and $I_3'(x)$ thus differ from the ideal values of A(x), B(x) and φ(x). This is illustrated in FIG. 2, showing the intensity waveform 32 obtained using the actually measured intensity values $I_0'$, $I_1'$, $I_2'$ and $I_3'$ (represented by the dashed boxes 42) and the ideal intensity waveform (dotted curve 40) with corresponding ideal intensity values represented by the dotted boxes 44. The time indications on the time axis (horizontal axis) are expressed in units of the modulation period while the intensity indications on the vertical axis are given in arbitrary units. It shall be noted that the waveforms 32 and 40 not only differ in offset and amplitude but also in phase.

Figure 3:
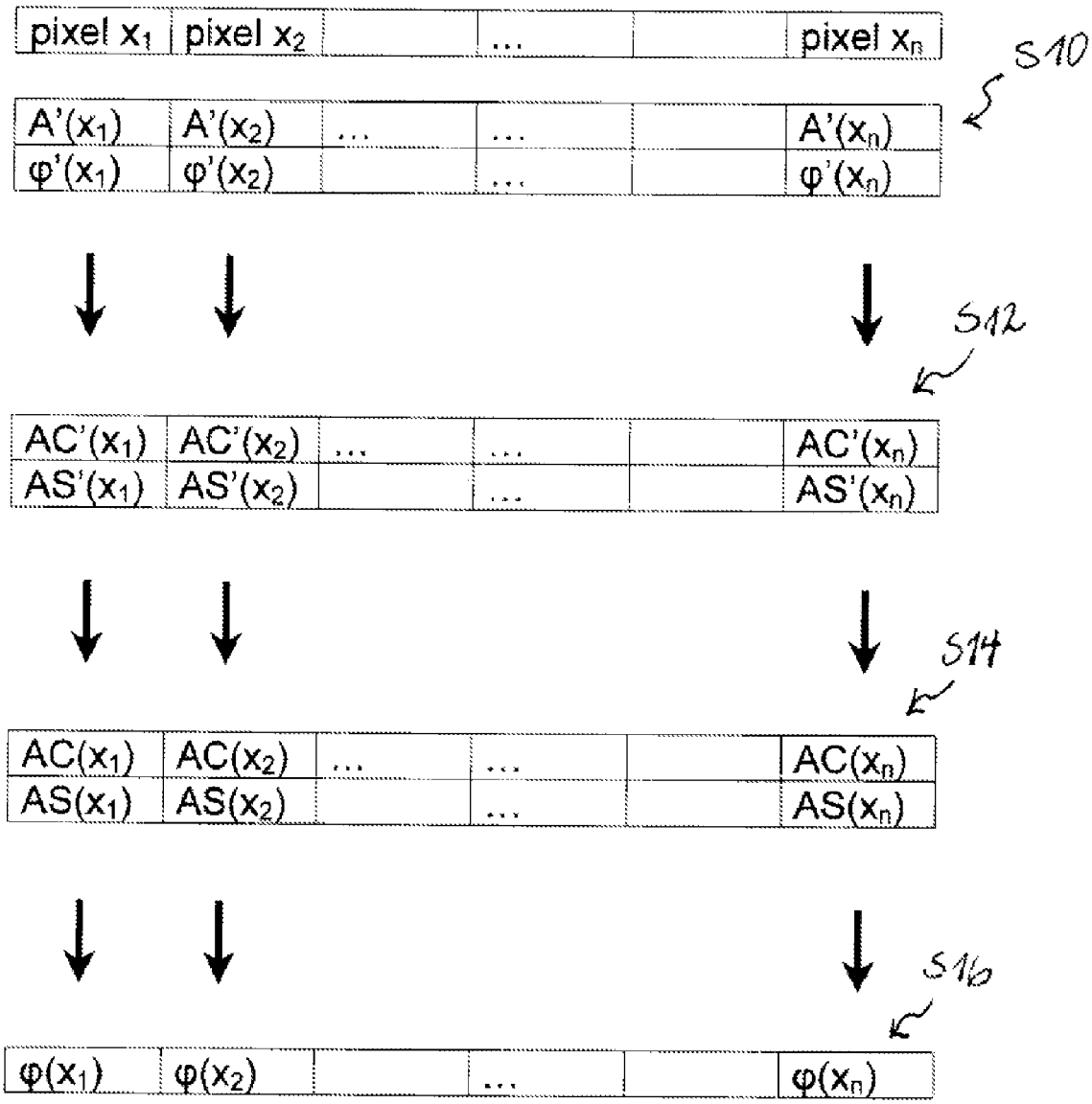
FIG. 3 is a flow chart of the method according to the first embodiment of the invention.

If the method according to the first embodiment of the invention is implemented by 3D camera 10, the evaluation circuit 26 determines first the parameters A'(x) and φ'(x) for each pixel. This is illustrated as step S10 in FIG. 3. To derive the corrected amplitudes A(x) and phases φ(x), the evaluation circuit computes the first data array $[AC'(x)]=[AC'(x_1), \ldots, AC'(x_n)]$ and the second data array $[AS'(x)]=[AS'(x_1), \ldots, AS'(x_n)]$, where $x_1, \ldots, x_n$ stand for the pixels of the pixel array onto which part of the scene is actually imaged (step S12 in FIG. 3). It shall be noted that in the context of the de-convolution, the reference pixels are deemed not being part of the pixel array since no part of the scene is imaged on them. It shall further be noted that the internal representation of the first and second data arrays in the evaluation circuit 26 can differ from the representation given here for illustration purposes. The values of the array elements AC'(x) and AS'(x) may be determined as indicated before, using equations (15) and (16) or, in case of the small phase approximation, (17) and (18). The evaluation circuit 26 then determines (step S14 in FIG. 3) de-convoluted versions [AC(x)] and [AS(x)] of the first and second data arrays respectively according to $$AC(x) = \sum_{x'} g'(x, x')AC'(x') \quad (25)$$

and $$AS(x) = \sum_{x'} g'(x, x')AS'(x'), \quad (26)$$

which corresponds to equations (19a) and (19b), taking into account that the integral is in this case a sum over the pixels of the pixel array. Advantageously, the de-convolution function g' is stored in a memory of the evaluation circuit, e.g. in form of a matrix [[g'(x,x')]]. The evaluation circuit then determines (step S16 in FIG. 3), for each pixel (other than the reference pixels) the corrected phase $\phi(x)$ using equations (21) or (22), depending on whether the small phase approximation is used or not. The distance values are finally computed using the corrected phases $\phi(x)$ and the reference phase determined with the reference pixels 19.

The method according to the first embodiment is particularly useful if the 3D camera gives no access to the raw data (in the above example the values $I_0'$, $I_1'$, $I_2'$ and $I_3'$) or if such access would be complicated.

Figure 4:
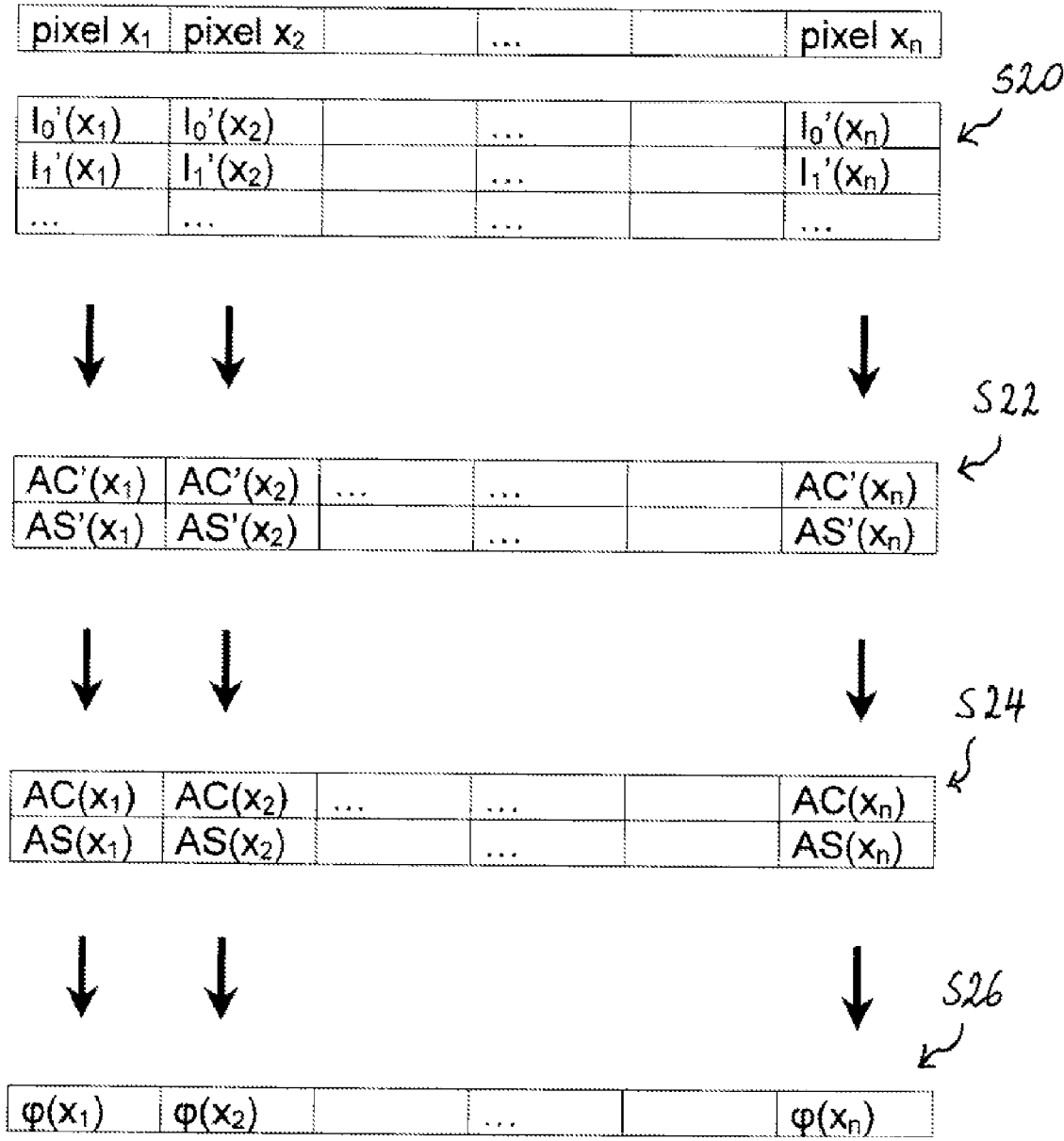
FIG. 4 is a flow chart of the method according to the second embodiment of the invention.

If the method according to the second embodiment of the invention discussed hereinbefore is implemented by 3D camera 10, the evaluation circuit 26 forms data arrays $[I_k'(x)] = [I_k'(x_1), \ldots, I_k'(x_n)]$, $k=0, \ldots, 3$. Each of these data arrays is thus associated to a specific phase of the modulation, each array element of the data arrays is associated with a pixel of the pixel array and has a value corresponding to the intensity value of the associated pixel at the specific phase of the modulation. These data arrays are then de-convoluted, yielding de-convoluted data arrays having array elements defined by $$I_k(x) = \sum_{x'} g'(x, x') I_k'(x') \tag{27}$$

which corresponds to equation (23), taking into account that the integral is in this case a sum over the pixels of the pixel array. Alternatively, the evaluation circuit might also form data arrays obtainable from linearly combining the data arrays $[I_k'(x)]$, $k=0, \ldots, 3$ and then de-convolute these linearly combined data array, e.g. as in equation (19). In the example of FIG. 4, the arrays $[I_k'(x)] = [I_k'(x_1), \ldots, I_k'(x_n)]$, $k=0, \ldots, 3$ formed in step 20 are linearly combined to yield the data arrays $[AC'(x)] = [AC'(x_1), \ldots, AC'(x_n)]$ and $[AS'(x)] = [AS'(x_1), \ldots, AS'(x_n)]$ (step 22), e.g. using the equations $AS'(x) = (I_2'(x) - I_0'(x))/2$ and $AC'(x) = (I_1'(x) - I_3'(x))/2$, provided that the four phases of the modulation are spaced by 90 degrees. The evaluation circuit then determines (step S24 in FIG. 4) de-convoluted versions $[AC(x)]$ and $[AS(x)]$ of the data arrays respectively according to equation (25) and (26). The evaluation circuit then determines (step S26 in FIG. 4), for each pixel the corrected phase $\phi(x)$ using equations (21) or (22), depending on whether the small phase approximation is used or not.

As in the previous example, the function g' may be stored internally in the evaluation circuit 26 e.g. in form of a matrix. The evaluation circuit 26 than computes the corrected phases $\phi(x)$ based upon equation (21) or (22), as well as the distance values using the corrected phases $\phi(x)$ and the reference phase determined with the reference pixels 19.

It shall be noted that those skilled in art of optical imaging systems know how to determine a suitable de-convolution function for a given optical system. Nevertheless, a specific example of a point-spread function and the associated de-convolution function will now be discussed for the purpose of illustration.

The present correction compensates the influence of the homogenous part of the stray light on the amplitude and phase measurement. The point-spread function $g_h$ corresponding to such homogeneous spreading of light around the theoretical image point is given by $$g_h(x',x) = (1-\epsilon)\delta(x',x) + \epsilon E_V(x) \tag{28}$$

where $E_V$ denotes a function which is constant on an area V and 0 elsewhere:

$$E_V(x) = \frac{1}{\int_V dx} \begin{cases} 1 & x \in V \\ 0 & x \notin V \end{cases} \tag{29}$$

Point spread function $g_h$ can be inverted. The result is $$g_h'(x, x') = \frac{1}{1-\epsilon}[\delta(x, x') - \epsilon E_V(x')] \tag{30}$$

Inserting equation (21) into (5) yields for the corrected complex amplitude the expression $$\hat{A}(x) = \frac{1}{1-\epsilon}[\hat{A}'(x) - \epsilon \langle \hat{A}' \rangle], \tag{31}$$

where $\langle \hat{A}' \rangle$ denotes the average of the complex amplitude $\hat{A}'$ in the area V. This means that the correct complex phase is obtained by subtracting from the measured complex phase a certain portion of the average of the complex amplitude. The corrected phase and amplitude are then obtained by applying equation (20) to the real and imaginary parts of $\hat{A}$, respectively. The de-convolution of the first and second data arrays may thus be effected through $$AC(x) = \frac{1}{1-\epsilon}[AC'(x) - \epsilon \langle AC' \rangle] \tag{32}$$

$$AS(x) = \frac{1}{1-\epsilon}[AS'(x) - \epsilon \langle AS' \rangle]$$

where $\langle AC' \rangle$ and $\langle AS' \rangle$ denote the averages of $AC'(x)$ and $AS'(x)$, respectively, in the area V. Equation (32) expresses that the de-convolution may be effected in the case of homogeneous spreading by withdrawing from each array element of the first data array $[AC'(x)]$ a fraction $\epsilon$ of an averaged value of the values of the array elements of the first data array and from each array element of the second data array $[AS'(x)]$ the same fraction $\epsilon$ of an averaged value of the values of the array elements of the second data array.

The homogenous compensation (30) combined with the small phase approximation (equations (17) and (18)) yields:

$$A(x) = \frac{1}{1-\epsilon}[A'(x) - \epsilon \langle A' \rangle] \tag{33}$$

$$AS(x) = \frac{1}{1-\epsilon}[A'(x)\varphi'(x) - \epsilon \langle A'\varphi' \rangle]$$

$$\varphi(x) = AS(x)/A(x)$$

The de-convolution is easy to calculate in this manner, as it requires only once the computation of the mean value of the amplitudes $\langle A' \rangle$ and the mean value of the amplitude-weighted phase (or phase-weighted amplitude) $\langle A'\phi' \rangle$ in the area V. Note that the word "homogenous" refers to the stray light amplitude, not to the resulting correction term $\Delta\phi(x)=\phi(x)-\phi'(x)$. For each pixel, the correction of the phase will be strongly depend on the phase $\phi'(x)$ and the amplitude $A'(x)$ measured in that pixel, and is thus not a homogeneous function. This become apparent by calculating the phase shift resulting from equation (33):

$$\Delta\varphi(x) = \frac{A'(x)\varphi'(x) - \varepsilon\langle A'\varphi'\rangle}{A'(x) - \varepsilon\langle A'\rangle} = \frac{A'(x')\varphi'(x) - \varepsilon\langle A'\varphi'\rangle}{A(x)} \quad (34)$$

The phase shift at pixel x is thus inversely proportional to the corrected amplitude at this pixel.

It shall be noted that the correction of homogeneous spreading can equally well be applied to the method that uses equations (23) or (19). Replacing g'(x, x') in equation (23) by $g_h'$(x, x') given by equation (30) yields:

$$I_k'(x) = \frac{1}{1-\varepsilon}[I_k'(x) - \varepsilon\langle I_k'\rangle], \quad (35)$$

where $\langle I_k'\rangle$ denotes the average of the intensity values $I_k'(x)$ in the area V. Equation (35) expresses that the data arrays associated to the respective phases of the modulation are de-convoluted by withdrawing from each array element $I_k'(x)$ the fraction $\varepsilon$ of an averaged value $\langle I\rangle$ of the values of the array elements of the data array. A similar expression can easily be derived by replacing g'(x, x') in equation (19) by $g_h'$(x, x').

The parameter $\varepsilon$ quantifies the amount of light that is homogenously strayed by the optics of the system. Usually this parameter can be determined by an optical measurement and takes a fixed value for a given optics. However, in case of contamination of the optical system, the amount of scattered light can increase. If the level of contamination is dynamically determined and the parameter $\varepsilon$ adjusted in accordance, the present method also allows correcting the loss of phase and amplitude contrast on account of the level of contamination. A method for determining the level of contamination is disclosed, for instance, in European patent application 07 110 379.0, which is herewith incorporated herein by reference in its entirety.

The invention claimed is:

1. Method of recording 3D images of a scene based on a time-of-flight principle, comprising
    illuminating a scene by emitting light carrying an intensity modulation;
    imaging the scene onto a pixel array using an optical system;
    detecting, in each pixel, intensity-modulated light reflected from the scene onto said pixel, said intensity-modulated light detected in the pixel having an amplitude and a phase;
    determining, for each pixel, an amplitude value and a phase value of the amplitude and the phase, respectively, of said intensity-modulated light detected in the pixel
    determining, for each pixel, a distance value based on the phase value of said intensity-modulated light detected in the pixel;
    wherein determining said distance values comprises a phase-sensitive de-convolution of said scene imaged onto said pixel array such as to compensate for phase errors induced by light spreading in said optical system,
    wherein said phase-sensitive de-convolution of said scene imaged onto said pixel array comprises
    forming a first data array, each array element of said first data array being associated with a pixel of said pixel array and having a value corresponding to the amplitude value determined for the associated pixel weighted with a first phase factor;
    forming a second data array, each array element of said second data array being associated with a pixel of said pixel array and having a value corresponding to the amplitude value determined for the associated pixel weighted with a second phase factor, said second phase factor depending on the phase value determined for the associated pixel;
    de-convoluting said first and second arrays based upon a de-convolution function of said optical system,
    wherein, for each pixel, said distance value is calculated based upon the values of the array elements of said de-convoluted first and second arrays associated to the pixel, and
    wherein the de-convolution of said first and second arrays is effected by withdrawing from each array element of said first array a certain fraction of an averaged value of the values of the array elements of said first array and from each array element of said second array a corresponding fraction of an averaged value of the values of the array elements of said second array.

2. The method according to claim 1, wherein said first phase factor is the cosine of the phase value determined for the associated pixel and wherein said second phase factor is the sine of the phase value determined for the associated pixel.

3. The method according to claim 2, wherein, for each pixel, calculating the distance value comprises determining a corrected phase as $\phi(x)=\arctan(AS(x)/AC(x))$, where x identifies the pixel, $\phi(x)$ denotes the corrected phase, AC(x) denotes the array element of the de-convoluted first array associated to the pixel and AS(x) denotes the array element of the de-convoluted second array associated to the pixel.

4. The method according to claim 1, wherein said first phase factor is 1 and wherein said second phase factor is the phase value itself.

5. The method according to claim 4, wherein for each pixel, calculating the distance value comprises determining a corrected phase as $\phi(x)=AS(x)/AC(x)$, where x identifies the pixel, $\phi(x)$ denotes the corrected phase, AC(x) denotes the array element of the de-convoluted first array associated to the pixel and AS(x) denotes the array element of the de-convoluted second array associated to the pixel.

6. The method according to claim 1, wherein a level of contamination of said optical system is evaluated and wherein said phase-sensitive de-convolution is adjusted to said level of contamination.

7. Method of recording 3D images of a scene based on a time-of-flight principle, comprising
    illuminating a scene by emitting light carrying an intensity modulation;
    imaging the scene onto a pixel array using an optical system;
    detecting, in each pixel, intensity-modulated light reflected from the scene onto said pixel, said intensity-modulated light detected in the pixel having an amplitude and a phase, said detecting of intensity-modulated light reflected from said scene comprising, for each pixel, determining intensity values of the intensity-modulated light impinging on the pixel at different modulation phases, said different modulation phases being chosen such that amplitude and phase of the intensity-modulated light impinging on said pixel are derivable from said set of intensity values using a known relationship;

determining, for each pixel, a distance value based on a phase-sensitive de-convolution of said scene imaged onto said pixel array such as to compensate for phase errors induced by light spreading in said optical system, wherein said phase-sensitive de-convolution of said scene comprises forming data arrays, each array element of said data arrays being associated with a pixel of said pixel array and having a value corresponding either to the intensity value of the associated pixel determined at one of said modulation phases or to a linear combination of at least two intensity values of the associated pixel determined at different modulation phases;

de-convoluting said data arrays using a de-convolution function of said optical system, wherein, for each pixel, the distance value is calculated based upon the values of the array elements of said de-convoluted data arrays associated to the pixel, and wherein the de-convolution of each of said data arrays is effected by withdrawing from each array element of the data array a certain fraction of an averaged value of the values of the array elements of the data array.

8. The method according to claim 7, wherein said intensity values are determined at least three different modulation phases.

9. The method according to claim 8, wherein said at least three modulation phases are regularly spaced.

10. The method according to claim 9, wherein said intensity values are determined at four modulation phases, said four modulation phases being spaced by 90 degrees.

11. The method according to claim 7, wherein, for each pixel, calculating said distance value comprises determining a corrected phase from the values of the array elements of said de-convoluted data arrays associated to the pixel.

12. The method according to claim 7, wherein a level of contamination of said optical system is evaluated and wherein said phase-sensitive de-convolution is adjusted to said level of contamination.

13. A 3D time-of-flight imager, comprising
a light source configured to illuminate a scene by emitting light carrying an intensity modulation;
a pixel array;
an optical system configured to image the scene onto said pixel array, each pixel of said pixel array being configured to detect intensity-modulated light reflected from the scene onto said pixel, said intensity-modulated light detected in the pixel having an amplitude and a phase;
and a control and evaluation circuit configured to determine, for each pixel, a distance value based on the phase of said intensity-modulated light detected in the pixel;
wherein said control and evaluation circuit is configured to carry out a phase-sensitive de-convolution of said scene imaged onto said pixel array in such a way as to compensate for phase errors induced by light spreading in said optical system,
wherein said phase-sensitive de-convolution of said scene imaged onto said pixel array comprises
forming a first data array, each array element of said first data array being associated with a pixel of said pixel array and having a value corresponding to the amplitude value determined for the associated pixel weighted with a first phase factor;
forming a second data array, each array element of said second data array being associated with a pixel of said pixel array and having a value corresponding to the amplitude value determined for the associated pixel weighted with a second phase factor, said second phase factor depending on the phase value determined for the associated pixel;
de-convoluting said first and second arrays based upon a de-convolution function of said optical system,
wherein, for each pixel, said distance value is calculated based upon the values of the array elements of said de-convoluted first and second arrays associated to the pixel, and
wherein the de-convolution of said first and second arrays is effected by withdrawing from each array element of said first array a certain fraction of an averaged value of the values of the array elements of said first array and from each array element of said second array a corresponding fraction of an averaged value of the values of the array elements of said second array.

14. The 3D time-of-flight imager according to claim 13, wherein said control and evaluation circuit comprises at least one of an application-specific integrated circuit, a field-programmable gate array and a microprocessor to carry out said phase-sensitive de-convolution of said scene imaged onto said pixel array.

* * * * *